March 11, 1958  W. G. HAMPTON ET AL  2,826,729
BRAKED ELECTROMOTOR SERVOSYSTEM
Filed March 26, 1957  7 Sheets-Sheet 1

INVENTORS
WILLIAM GEORGE HAMPTON
WALTER FORD CONABLE
BY
ATTORNEY

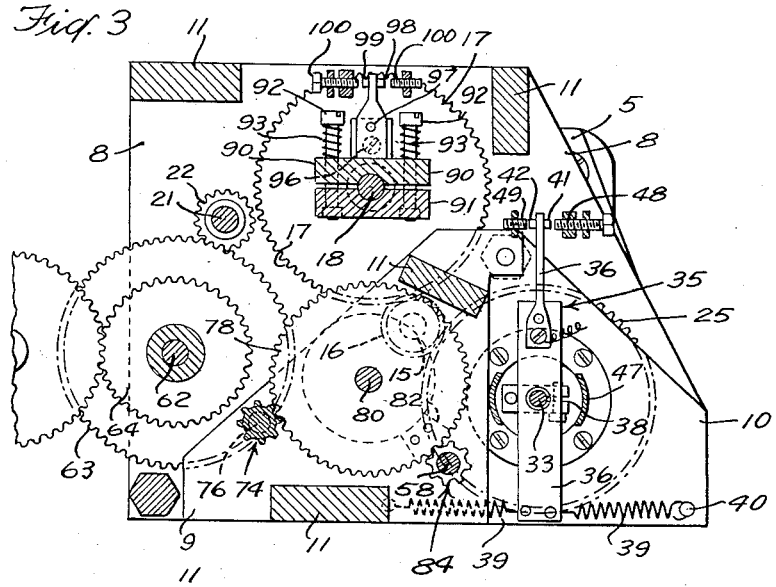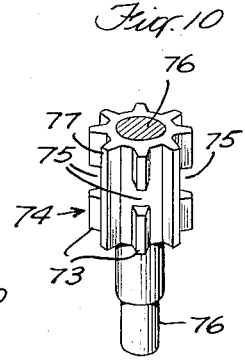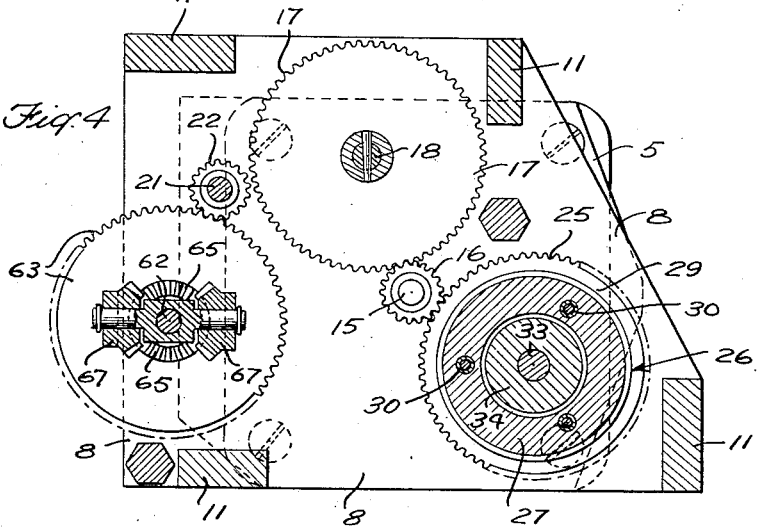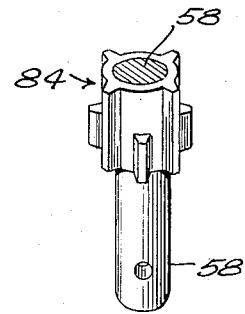

March 11, 1958 W. G. HAMPTON ET AL 2,826,729
BRAKED ELECTROMOTOR SERVOSYSTEM
Filed March 26, 1957 7 Sheets-Sheet 3

INVENTORS
WILLIAM GEORGE HAMPTON
WALTER FORD CONABLE
BY
Victor D. Borst
ATTORNEY

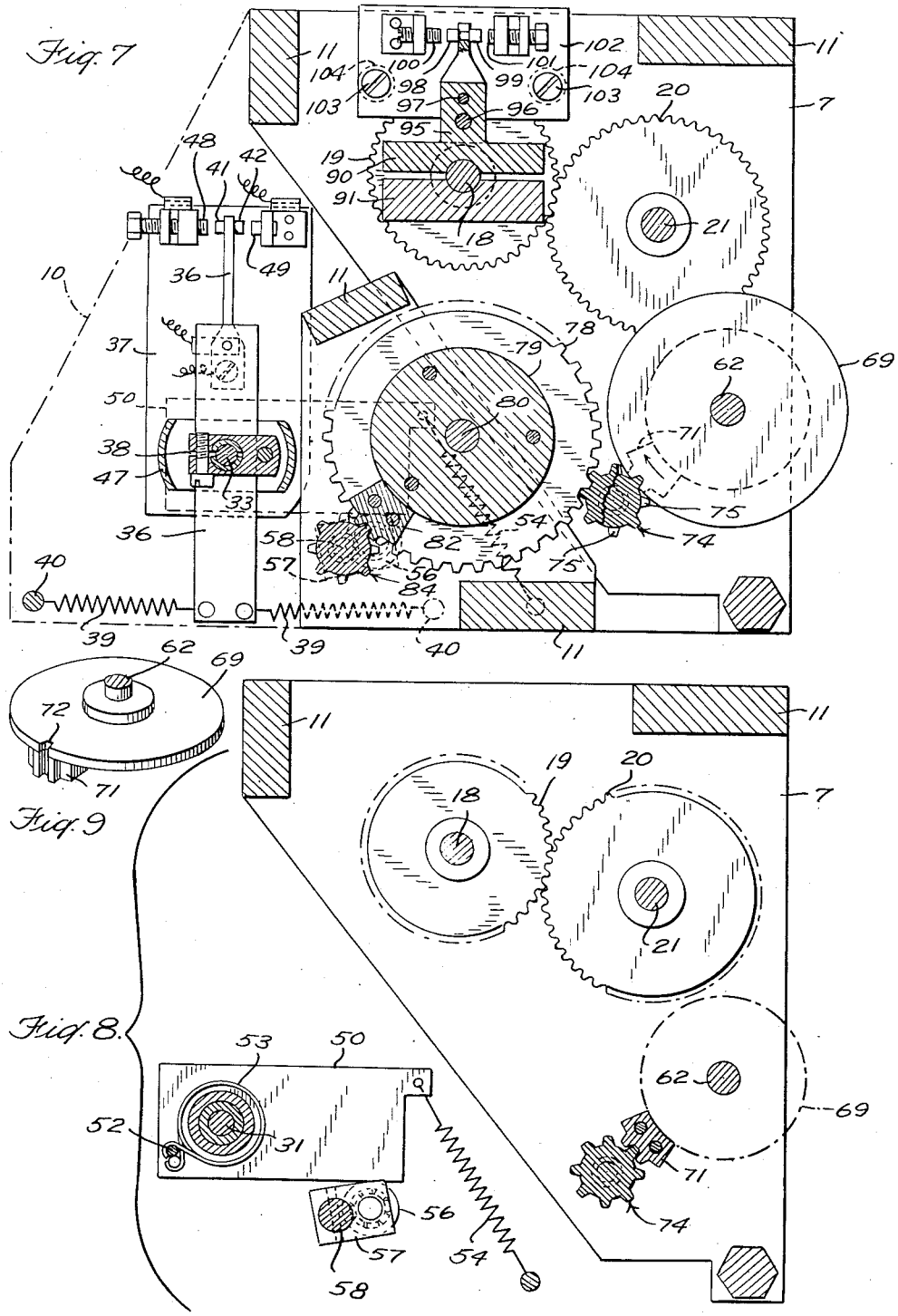

INVENTORS
WILLIAM GEORGE HAMPTON
WALTER FORD CONABLE

BY *Victor D. Borst*

ATTORNEY

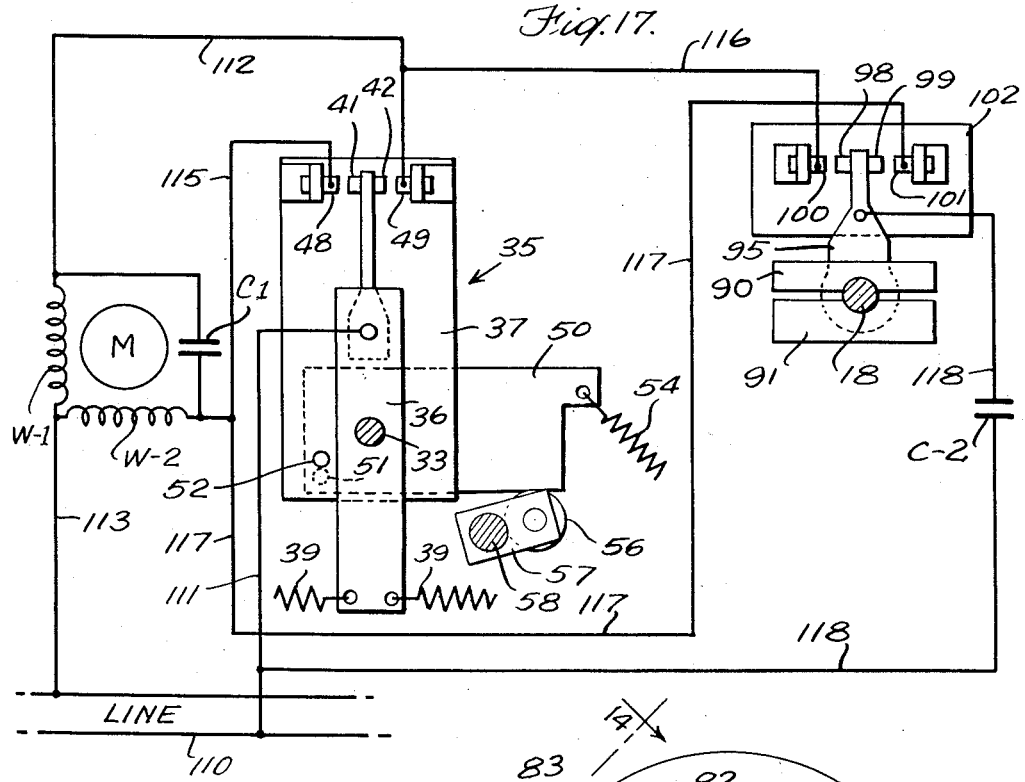
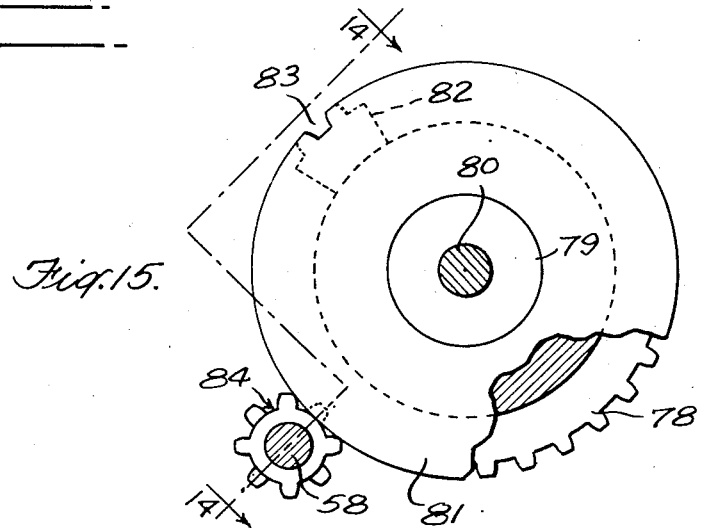
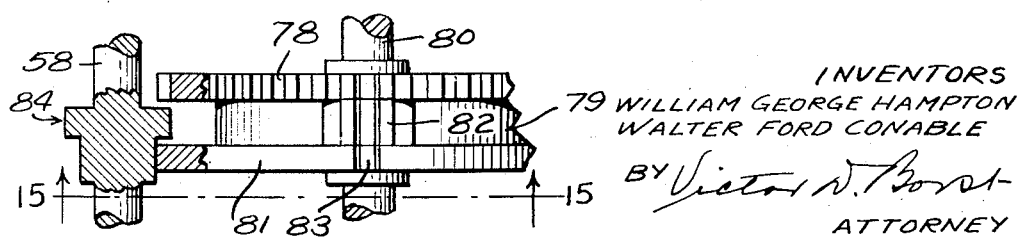

March 11, 1958  W. G. HAMPTON ET AL  2,826,729
BRAKED ELECTROMOTOR SERVOSYSTEM
Filed March 26, 1957  7 Sheets-Sheet 7

INVENTORS
WILLIAM GEORGE HAMPTON
WALTER FORD CONABLE
BY
ATTORNEY

United States Patent Office 2,826,729
Patented Mar. 11, 1958

2,826,729

BRAKED ELECTROMOTOR SERVOSYSTEM

William G. Hampton, Bayside, and Walter F. Conable, Manhasset, N. Y., assignors to Sperry Rand Corporation, Ford Instrument Company Division, Long Island City, N. Y., a corporation of Delaware Application March 26, 1957, Serial No. 648,730

21 Claims. (Cl. 318—448)

This invention relates generally to servo mechanisms in which the servo motor thereof operates in accordance with an input signal imparted thereto.

Servo mechanisms of this character comprise generally a reversible motor, a double throw switch by which the energization of the motor is controlled, switch actuating means which is operatively connected to the motor control switch and a differential which is connected to both the switch actuating means and to the output shaft of the motor. The motor control switch is opened and closed by the switch actuating means in accordance with an input signal imparted thereto through the differential. The differential computes the error between the motor output and the input signal and algebraically adds it to the input signal until the output of the motor is synchronized with the input signal.

It is characteristic of servo mechanisms of this character that the motor will hunt or overshoot in first one direction and then the other during synchronization when the input signal calls for a change in position. This is due to the fact that the same motor torque is used for both acceleration and deceleration. In a servo loop in which the torque to inertia ratio is relatively low to obtain smoothness, the built-in velocity lag error or anticipation does not extend to the slew velocity of the motor, so that under normal motor torque the motor is unable to stop within the anticipation distance provided.

In accordance with our invention we increase the deceleration rate of a servo mechanism of the aforesaid character by increasing the torque applied to the motor during deceleration without changing the torque applied thereto during acceleration. This added torque reduces the motor stopping distance and the amount of overshoot during synchronization which materially decreases the overall synchronizing time without appreciably increasing the roughness.

It is therefor the principal object of the invention to improve the synchronizing of a velocity lag contact type servo by reducing the duration and number of overshoots during synchronization.

The principal object of the invention having been stated other and more limited objects of the invention will be apparent from the following specification and the accompanying drawing forming a part thereof in which:

Fig. 3 is a vertical sectional view taken substantially of the line 3—3 of Fig. 1;

Fig. 4 is a vertical sectional view taken substantially of the line 4—4 of Fig. 1;

Fig. 7 is a vertical sectional view taken substantially on the line 7—7 of Fig. 1;

Fig. 8 is a vertical sectional view taken substantially on the line 8—8 of Fig. 1;

Fig. 9 is a detail perspective view of one of the locking discs and a two toothed segmental gear carried thereby;

Fig. 10 is a perspective view of one of the mutilated pinion gears through which the input signal is imparted to the motor control switch;

Fig. 11 is a perspective view of another mutilated pinion gear through which the input signal is imparted to the motor control switch;

Fig. 14 is an enlarged detail sectional view showing the manner in which the pinion gear shown in Fig. 11 is intermittently rotated two teeth at a time by the pinion gear shown in Fig. 10 and is locked against rotation during the dwells in the rotation thereof, the plane of the section being indicated by the line 14—14 on Fig. 15;

Fig. 15 is a detail sectional view taken on the line 15—15 of Fig. 14;

Fig. 17 is a wiring diagram of the mechanism shown in Figs. 1 to 16 inclusive;

Figures 1, 2:
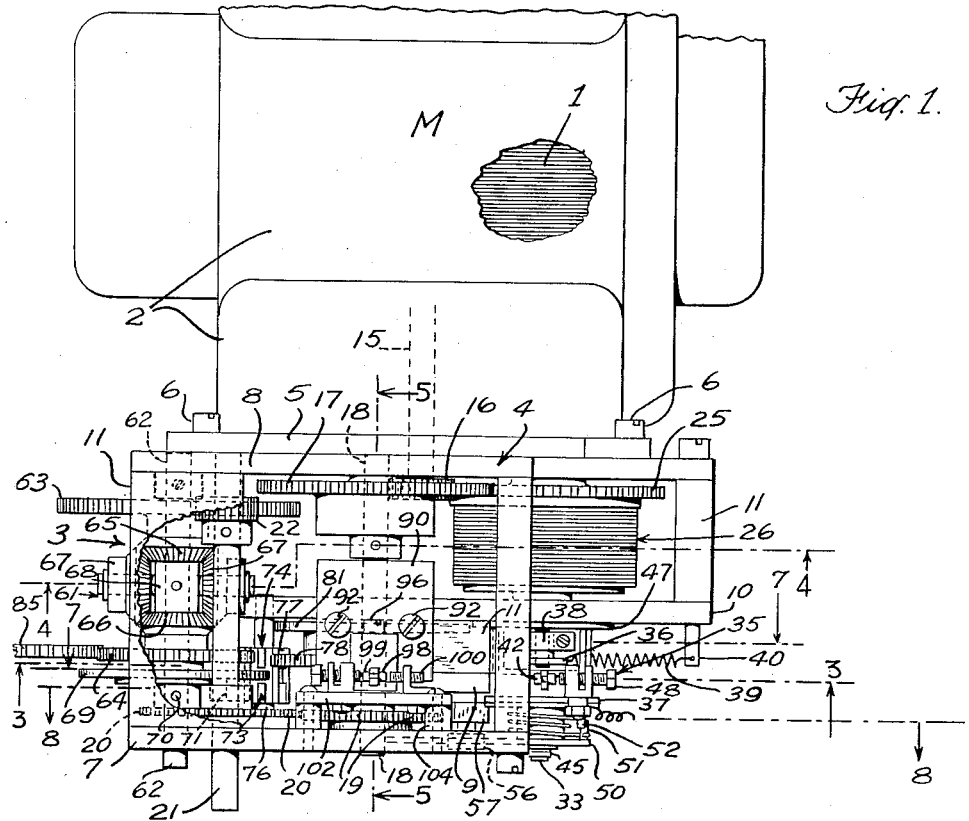
Fig. 1 is a plan view of a servo motor control mechanism having our invention incorporated therein.
Fig. 2 is a front elevation of the mechanism shown in Fig. 1 with parts broken away for purposes of illustration.
Figure 5:
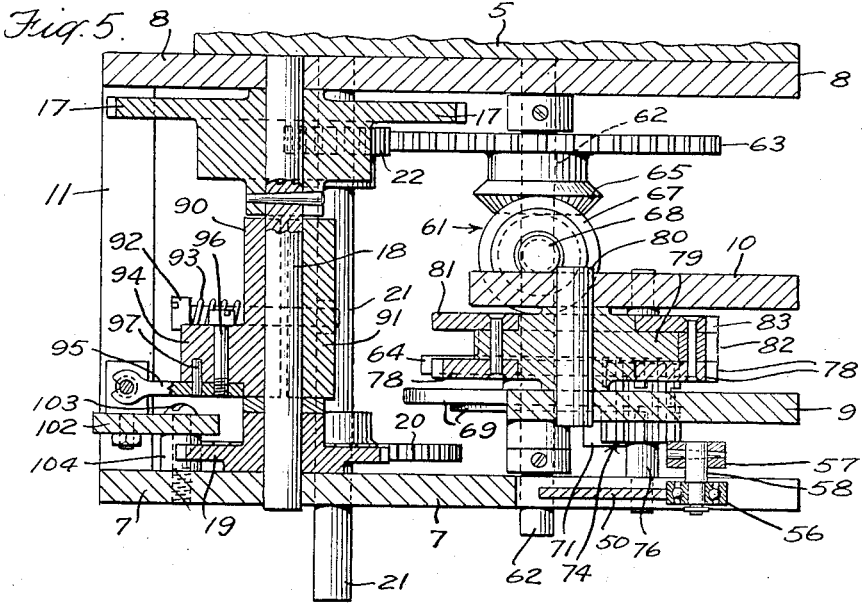
Fig. 5 is a vertical sectional view taken substantially on the line 5—5 of Fig. 1.
Figure 6:
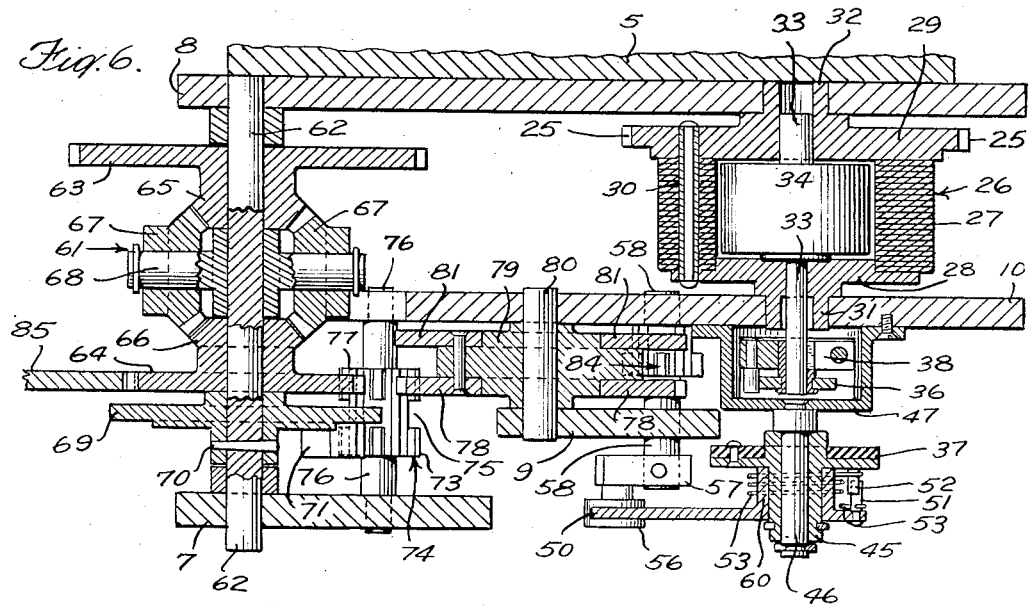
Fig. 6 is a horizontal sectional view taken substantially on the line 6—6 of Fig. 2.
Figure 16:
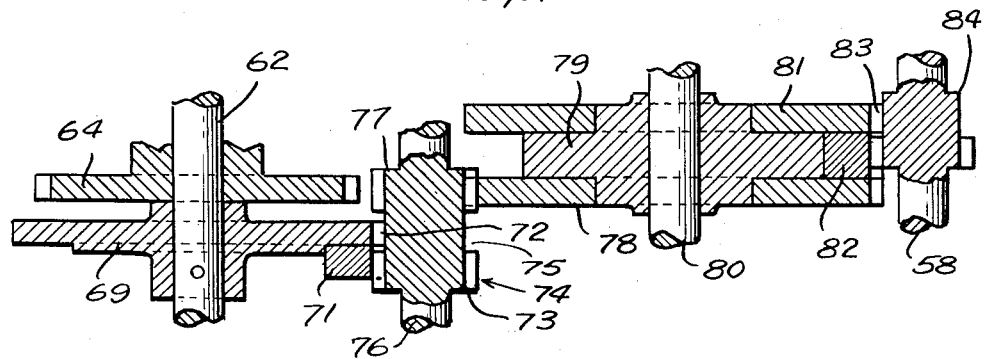
Fig. 16 is a diagrammatic view partially in plan and partially in section illustrating the train of gearing between the differential and the motor control switch.
Figure 12:
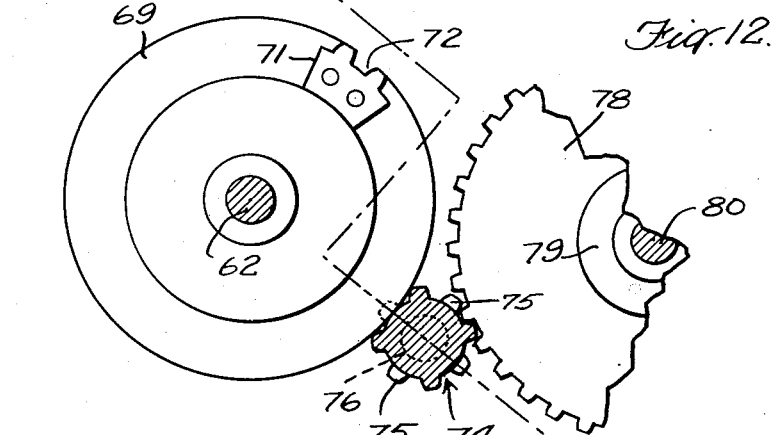
Fig. 12 is an enlarged detail sectional view showing the manner in which the pinion gear shown in Fig. 10 is intermittently rotated two teeth at a time by the differential and is locked against rotation during the dwells in its rotation thereof, the plane of the section being indicated by the line 12—12 on Fig. 13.
Figure 13:
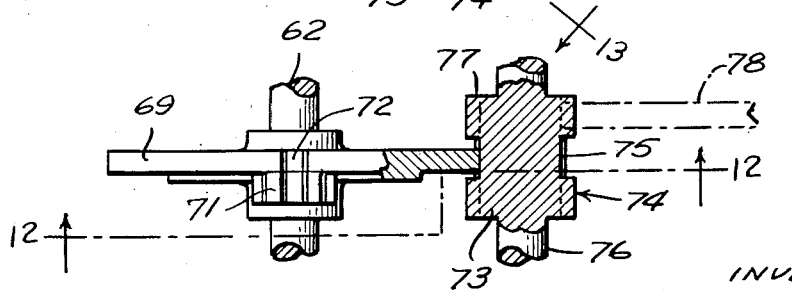
Fig. 13 is a detail sectional view taken on the line 13—13 of Fig. 12.

Referring now to the drawings by reference characters the letter M indicates a reversible servo motor, which is mounted in a casing 2, and 3 indicates generally a control mechanism through which the operation of the motor M is controlled in accordance with an input signal imparted to the control mechanism 3. The motor M is conventional two phase induction motor having the winding W-1 and W-2 and the capacitor C-1. The control mechanism 3 is mounted in a frame 4 which is removably secured to a flange 5 on the motor casing 2 by attaching screws 6. The frame 4 comprises the front and rear panels 7 and 8 respectively and the intermediate panels 9 and 10 all of which are rigidly secured together by the transversely extending connecting members 11.

The armature shaft 15 of the motor M, which extends out from the casing 2 and through the rear panel 8 into the frame 4, has a small pinion gear 16 secured to the outer end thereof. The pinion 16 meshes with a gear 17 which is pinned to an intermediate idler shaft 18, adjacent the rear end thereof. The idler shaft 18 which is rotatably supported by and between the front and rear panels 7 and 8 has a gear 19 rigidly secured thereon adjacent the front panel 7. The gear 19 meshes with a gear 20 secured to the output shaft 21 which is rotatably supported by and between the front and rear panels 7 and 8. The output shaft 21 also has a small pinion gear 22 secured thereon adjacent the rear end thereof, the function of which will be explained hereinafter. The output of the motor 1 is therefore through the pinion 16, gear 17, intermediate idler shaft 18, gear 19, gear 20 and output shaft 21.

The drive pinion 16 also meshes with a gear 25 carried by a conventional magnetic drag 26. The magnetic drag 26 comprises a laminated tubular body 27 and the end caps 28 and 29 all of which are rigidly connected together by rivets 30. The end caps 28 and 29 are provided with trunnions 31 and 32 by which the magnetic drag is rotatably supported by and between the panels 8 and 10. The trunnions 31 and 32 have aligned axial bores in which is rotatably mounted a shaft 33 one end of which extends out through the trunnion 31. An armature 34 is rigidly secured upon the shaft 33 within the housing 27 between the end caps 28 and 29.

The switch, generally indicated by the numeral 35, by which the operation of the motor M is controlled in accordance with an input signal comprises a contact arm 36 and a contact carrier plate 37. The contact arm 36 is clamped to the outer end of the shaft 33 as indicated at 38, and is yieldingly held in normal vertical position, as shown in Figs. 2, 3 and 7, by a pair of opposed tension springs 39 which are connected to the lower end of the arm 36 and to pins 40 carried by the frame 4. A pair of opposed contacts 41 and 42 are carried by the upper end of the contact arm 36. The contact carrier plate 37 is secured to a hub 45 which is rotatably mounted upon a stud 46 which is secured to and extends outwardly from a U-bracket 47 in axial alignment with the shaft 33. The bracket 47 straddles the contact arm 36 and is secured to the panel 10. A pair of opposed contacts 48 and 49 are secured to the upper end of the plate 36 in alignment with the contacts 41 and 42 carried by the arm 36. An arm 50 which is rotatably mounted upon the hub 45 carries a rearwardly extending pin 51 which is adapted to engage a forwardly extending pin 52 carried by the plate 37. A coil spring 53 which is disposed around the hub 60 of the arm 50 with one end thereof connected to the pin 51 and the other end thereof connected to the pin 52 yieldingly holds pins 51 and 52 in engagement with each other. With this construction the plate 37 as shown in Figs. 2 and 3 will be positively rotated in a counter-clockwise direction by the arm 50 through the pins 51 and 52 when the arm 50 is rotated counter-clockwise, and when the arm 50 is rotated in a clockwise direction the spring 53 will cause the plate 37 to follow the arm 50. The construction is also such that the plate 37 can be moved counter-clockwise independently of the arm 50. A spring 54 having one end thereof secured to the free end of the arm 50 and the other end thereof secured to a pin 55 carried by the frame 4 yieldingly holds the lower edge of the arm 50 in engagement with a roller 56 carried by the outer end of a crank arm 57 which is secured to the outer end of a shaft 58, which is rotatably supported by and between the intermediate panels 9 and 10. The arm 50 is therefor positively rotated in a clockwise direction by the shaft 58 and crank 57 and is yieldably rotated counter-clockwise by the spring 54.

The mechanism by which the input signal is imparted to the motor control switch 35, with the error between the motor output and input signal algebraically added thereto, includes a differential generally indicated by the numeral 61. The differential 61 comprises a differential shaft 62 which is rotatably supported by and between the front and rear panels 7 and 8 respectively. An end gear 63, which meshes with and is driven by the gear 22 on the output shaft 21, is rotatably mounted upon the shaft 62 adjacent the rear end thereof; and an end gear 64 is rotatably mounted upon the shaft 62 in forwardly spaced relation to the end gear 63. The end gears 63 and 64 have opposing end bevel gears 65 and 66 formed integrally therewith. The end bevel gears 65 and 66 are geared together by a pair of spider pinions 67 which are rotatably mounted on opposite ends of a spider 68 carried by the differential shaft 62. A locking disk 69 is rigidly secured upon the shaft 62 adjacent the end gear 64 by a pin 70. The locking disk 69 has a two toothed segmental gear 71 secured to the outer face thereof, as shown in Figs. 7 and 9, and the periphery of the disk 69 is provided with a notch 72 which registers with the space between the two teeth of the segmental gear 71. As the disk 69 and with it the segmental gear 71 are rotated the gear 71 will mesh with the inner or rear end 73 of a mutilated pinion gear 74 and intermittently rotate the pinion gear 74 through two teeth every revolution of the disk 69 and segmental gear 71. The mutilated pinion gear 74 which is shown in detail in Fig. 10 is provided with an even number of teeth, alternate ones of which are cut away intermediate ends thereof as shown at 75 in Fig. 10. The locking disk 69 engaged the pinion 74 in the cut out sections 75 thereof with the periphery of the disk engaging the opposing faces of a pair of adjacent teeth extending the full length of the pinion thereby locking the pinion 74 against rotation when the segmental gear 71 is out of mesh with the pinion. During rotation of the pinion 74 by the segmental gear 71 the full length teeth of the pinion 74 will seat in the notch 72 of the disk 69 thereby permitting rotation of the pinion 74 through two teeth, after which the periphery of the disk will again engage the opposing faces of a pair of adjacent full length teeth on the pinion 74 and lock the pinion 74 against rotation until the next meshing of the segmental gear 71 with the teeth on the outer or forward end 73 of the pinion 74. The pinion 74 is rigidly mounted upon a shaft 76 which is rotatably supported by and between the outer panel 7 and the intermediate panel 10 with the inner or rear end 77 thereof in constant mesh with a gear 78.

The gear 78 is secured to the outer end of a hub 79 carried by a shaft 80 which is rotatably supported by and between the intermediate panels 9 and 10. A locking disk 81 similar to the locking disk 69 is secured to the inner end of the hub 79. The disk 79 has a two toothed segmental gear 82 similar to the segmental gear 71 secured to the outer face thereof, and the periphery of the disk 81 is provided with a notch 83 which registers with the space between the two teeth of the segmental gear 82. The segmental gear 82 is adapted to mesh with and intermittently rotate a mutilated pinion gear 84 through two teeth every revolution of the disk 81 and segmental gear 82. The pinion gear 84, which is shown in detail in Fig. 11, is rigidly secured to the inner end of the shaft 58 and is provided with alternate short and long teeth. The pinion gear 84 is intermittently rotated and locked against rotation by the segmental gear 82 and locking disk 81 in the same manner in which the pinion gear 74 is rotated and locked by the segmental gear 71 and locking disk 69. From the foregoing it will be seen that for every revolution of the differential shaft 62 the pinion gear 71 and intermediate spur gear 78 will be rotated two teeth, and that for every revolution of the intermediate gear 78 the pinion gear 84 will be rotated two teeth, which provides a great reduction in rotation between the differential shaft 62 and the ultimate shaft 58 driven thereby.

The input signal is imparted to the motor control switch mechanism 35, through the differential 61 and the gear train just described and shown in Figs. 12 to 16 inclusive, by a gear 85 which meshes with the differential end gear 69.

The operation of the mechanism thus far described will now be described in connection with Fig. 17 of the drawings. Assume that the shaft 58 through the crank arm 57, in response to an input signal, rotates the arm 50 and plate 37 in a counter-clockwise direction to bring the contacts 42 and 49 into engagement with each other. Current will then flow from one side 110 of the line through the conductor 111, arm 36 contacts 42 and 49, conductors 112, winding W-1 and conductor 113 back to the other side 114 of the line. The motor M will then rotate clockwise. When the motor reaches a predetermined R. P. M., the magnetic drag 26 will rotate the shaft 33 and contact arm 36 secured thereto counter-clockwise against the resistance of the springs 39 which will separate the contacts 42 and 49 and break the circuit to the motor. The motor M will then continue to rotate in a clockwise direction due to inertia but at a constantly decelerating speed. After the motor has decelerated to such an extent that the springs 39 overcome the action of the magnetic drag 26, the contacts 42 and 49 will again close and re-establish the circuit to the motor. The motor will then accelerate until the magnetic drag again separates the contacts 42 and 49 and breaks the circuit to the motor. From this it will be seen that during operation the circuit to the motor will be constantly made and broken whereby the speed of the motor is maintained substantially constant during operation. When the signal calls for a stoppage of the motor, the shaft 58 will move the crank 57 downwardly and the spring 54 will cause the arm 50 to follow the crank 50 then rotating the plate 37 clockwise and separating the contacts 42 and 49. But the motor will continue to rotate at a decelerating rate, due to inertia, until it stops. This decelerating rotation or overshooting the stopping position called for by the input signal is an error which the differential imparts to the shaft 58. The shaft 58 then moves the crank 57 further downwardly thus allowing the spring 54 and arm 50 to further rotate the plate 57 in a clockwise direction until the contact 48 engages the contact 41. Current will then flow from the side 110 of the line through the conductor 111, arm 36, contacts 41 and 48, conductor 115, winding W-2 and back to the other side 114 of the line through the conductor 113. The motor M will then rotate in a counterclockwise direction until it has corrected the error caused by the previous overshoot, at which time the shaft 58 and crank 57 will rotate the plate 37 counter-clockwise and separate the contacts 41 and 48 thus breaking the circuit to the motor. But due to inertia the motor will again overshoot, but in the opposite direction and of lesser duration. This error will then be imparted to the switch mechanism 35 by the differential 61 whereupon the motor will again rotate in the opposite direction to correct this error. It will thus be seen that during the synchronizing of the motor output with the input or error signal the motor will overshoot in first one direction and then the other. But since each successive overshoot is of lesser duration than the previous overshoot, the motor will finally stop with the output thereof synchronized with the input signal. However, there are always quite a number of overshoots in each direction during synchronizing which necessitate an objectionably long time for synchronizing; and as previously stated it is the primary purpose of this invention to improve the synchronizing time by reducing the number and duration of synchronizing overshoots.

The means by which we reduce the number and duration motor overshoots during synchronization in a servo mechanism of the aforesaid character will now be described. As previously stated, this is accomplished by increasing the torque applied to the motor during deceleration only, to thereby increase the deceleration rate. To this end we provide a switching mechanism 89 in conjunction with the switching mechanism 35. This switching mechanism 89 comprises a pair of blocks 90 and 91, which are frictionally secured upon the intermediate shaft 18, between the gears 17 and 19, by a pair of bolts 92 having coiled compression springs 93 mounted thereon between the top of the block 90 and the heads of the bolts 92 whereby the frictional engagement of the blocks 90 and 91 with the shaft 92 can be adjusted as desired. The frictional engagement between the blocks 90 and 91 and the shaft 18 must be such that the blocks will rotate with the shaft but which will permit rotation of the shaft 18 in the blocks 90 and 91 whenever the rotation of the blocks 90 and 91 is restrained. The block 90 is provided with an upwardly extending boss 94 to which is secured a switch arm 95 by a screw 96 and dowel pin 97. The switch arm 95 carries a pair of opposed contacts 98 and 99 which are disposed between a pair of contacts 100 and 101 secured to a stationary plate 102. The plate 102 is secured to the inner face of the front panel 7 by screws 103 and spacers 104. Although the switching mechanism 89 is shown herein as being mounted upon the intermediate shaft 18, it is to be understood that it could equally well be mounted upon the output shaft 21 with the same results. It could also be mounted upon a separate shaft therefor which is geared to the pinion 16 for rotation thereby. Its location is merely a matter of choice and convenience.

The switching mechanism 89 is operative to connect a second capacitor C-2 in parallel with the capacitor C-1 during deceleration only when the motor is overshooting due to inertia. The capacitor C-1, in the circuit, provides a certain phase shift between the voltage and current vectors thus causing the motor to develop a certain torque to accelerate the load in a direction to reduce the error signal. The connecting of the capacitor C-2 in the circuit in parallel with the capacitor C-1 during deceleration causes an increase in the phase shift between voltage and current vectors in the motor which increases the torque applied to the motor during deceleration. This increased torque causes the load to decelerate faster than it accelerates when only the capacitor C-1 is connected across the two phases of the motor.

The operation of the mechanism will now be described in connection with the switching mechanism 89 and the capacitor C-2, reference being had to Fig. 17 of the drawing. As shown in Fig. 17, the contact 49 of the switching mechanism 35 is connected to the contact 100 of the switching mechanism 89 by the conductor 116; the contact 101 of the switching mechanism 89 is connected to the conductor 115 by the conductor 117; and the contact arm 95 of the switching mechanism 89 is connected to the side 110 of the line by a conductor 118, in which the capacitor C-2 is interposed, and the conductor 111.

Assume now that in response to an input signal the plate 37 has been rotated counter-clockwise to make the circuit to the motor M through the contacts 42 and 49 and the winding W-1 as previously described. The motor M will then rotate the magnetic drag shaft 33 and the intermediate shaft 18 counter-clockwise. The counter-clockwise rotation of the shaft 18 will close the contacts 98 and 100, but there will be no flow of current therethrough since both the contact 98 and the contact 100 are then connected to the same side 110 of the line. As soon as the error signal causes the breaking of the circuit to the motor through the contacts 42 and 49 and the making of the circuit to the motor through the contacts 41 and 48, current will flow from the side 110 of the line through the motor winding W-2, as previously described, which will apply a counter-clockwise torque to the motor M. But during deceleration the motor will continue to rotate in a clockwise direction. As soon as the contacts 41 and 48 are closed, current will also flow from the side 110 of the line through the conductors 111 and 118, the contact arm 95, contacts 98 and 100, and back to the other side 114 of the line through the conductors 116, 112 and 113 which will connect the capacitor C-2 into the circuit in parallel with the capacitor C-1, and apply additional torque to the motor M in a counter-clockwise direction. As soon as the motor reverses its direction of rotation after deceleration the shaft 18, rotating now in a clockwise direction, will break the connection between the contacts 98 and 100 and make a connection between the contacts 99 and 101. The breaking of the connection between the contacts 98 and 100 will cut the capacitor C–2 out of the circuit, and the making of the connection between the contacts 99 and 101 will place everything in readiness to connect the capacitor C–2 back in to the circuit during deceleration of the motor in response to an error signal breaking the circuit to the motor through the contacts 41 and 48 and making the circuit to the motor through the contacts 42 and 49. Current will then flow from the side 110 of the line through the contacts 42 and 49 and winding W–1 as previously described. Current will also flow from the side 110 of the line through the conductor 111 and 118, switch arm 95, contacts 99 and 101 and back to the other side 114 of the line through the conductors 117, 115 and 113 which will again connect the capacitor C–2 into the circuit in parallel with the capacitor C–1, thereby applying additional torque to the motor in a clockwise direction. The application of this additional torque to the motor during deceleration greatly reduces the duration of overshoots during synchronizing which in turn greatly reduces the number of overshoots and thereby greatly reduces the synchronizing time.

Figure 18:
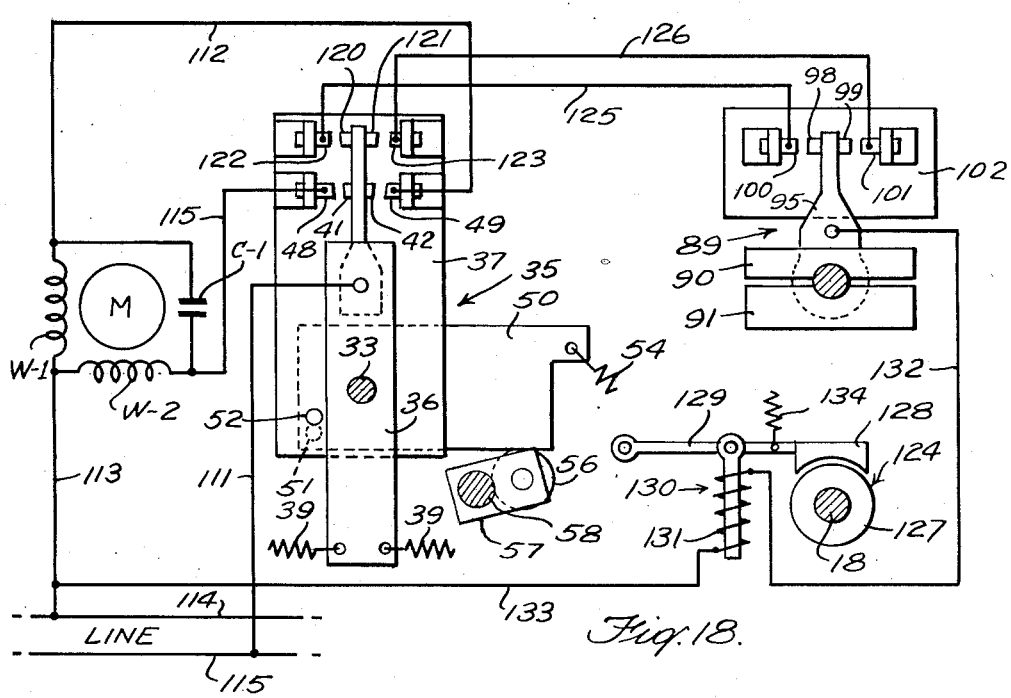
Fig. 18 is a view similar to Fig. 17 illustrating another means for increasing the torque applied to the motor shaft during deceleration.

In Fig. 18 of the drawings we have shown a slightly different means for applying additional torque to the motor M during deceleration. In this form of the invention we provide the contact arm 36 with an additional pair of contacts 120 and 121, and the contact carrier plate 37 with an additional pair of contacts 122 and 123 with which the contact 120 and 121 co-act; and we substitute a friction brake, generally indicated by the numeral 124, for the capacitor C–2. The contact 122 is connected to the contact 100 of the switching mechanism 89 by the conductor 125; and the contact 123 is connected to the contact 101 of the switching mechanisms 89 by the conductor 126.

The friction brake 124 comprises a drum 127 and a brake shoe 128. The drum 127 may be secured to the intermediate shaft 18, as indicated herein or it may be sccured to the output shaft 21, or it could be secured to a separate shaft provided therefor, and which is driven by the pinion 16. Like the switching mechanism 89, this also is merely a matter of choice and convenience. The brake shoe 128 is carried by a pivoted arm 129, and is adapted to be applied to the drum 127, during deceleration of the motor M, by a solenoid 130 which is operatively connected to the arm 129. One end of the solenoid winding 131 is connected to the switch arm 95, of the switching mechanism 89, by a conductor 132; and the other end of the solenoid winding 131 is connected to the conductor 113 by a conductor 123. A spring 134 connected to the arm 129 is provided to hold the shoe 128 out of engagement with the drum 127 when the solenoid is de-energized. In this form of the invention the operation of the motor M is controlled by the switching mechanism 35 in response to input and/or error signals in exactly the same manner as described in connection with Fig. 17. When the contacts 42 and 49 are closed to supply current to the motor M through the winding W–1, the contacts 121 and 123 will also be closed. The motor M will then rotate the shaft 18 in a counter-clockwise direction which will maintain the contacts 98 and 100 of the switching mechanism 89 closed, and the contacts 99 and 101 thereof open. No current, therefore, will flow from the side 110 of the line through the conductor 111, arm 36, and contacts 121 and 123 to the solenoid winding 131 since the contacts 99 and 101 are open. But when the switching mechanism is actuated, in response to an error signal, to open the contacts 42 and 49, and 121 and 123, and close the contacts 41 and 48, and 120 and 122, current will flow from the side 110 of the line through the conductor 111, contact arm 36, contacts 120 and 122, conductor 125, contacts 100 and 98, arm 95 and conductors 132 to the solenoid winding 131 and from there back to the other side 114 of the line through the conductors 133 and 113. The solenoid 130 being thus energized will then apply the brake 124 to the shaft 18 during deceleration of the motor which will materially increase the rate of deceleration. As soon as the motor M reverses the rotation of the shaft 18 after deceleration, the shaft 18 will open the contacts 98 and 100 and close the contacts 99 and 101. The opening of the contacts 98 and 100 will break the circuit to the solenoid 130 and release the brake 124; and the closing of the contacts 99 and 101 will set the mechanism in condition to apply the brake 124 to the shaft 18 during the next deceleration of the motor M.

Figure 19:
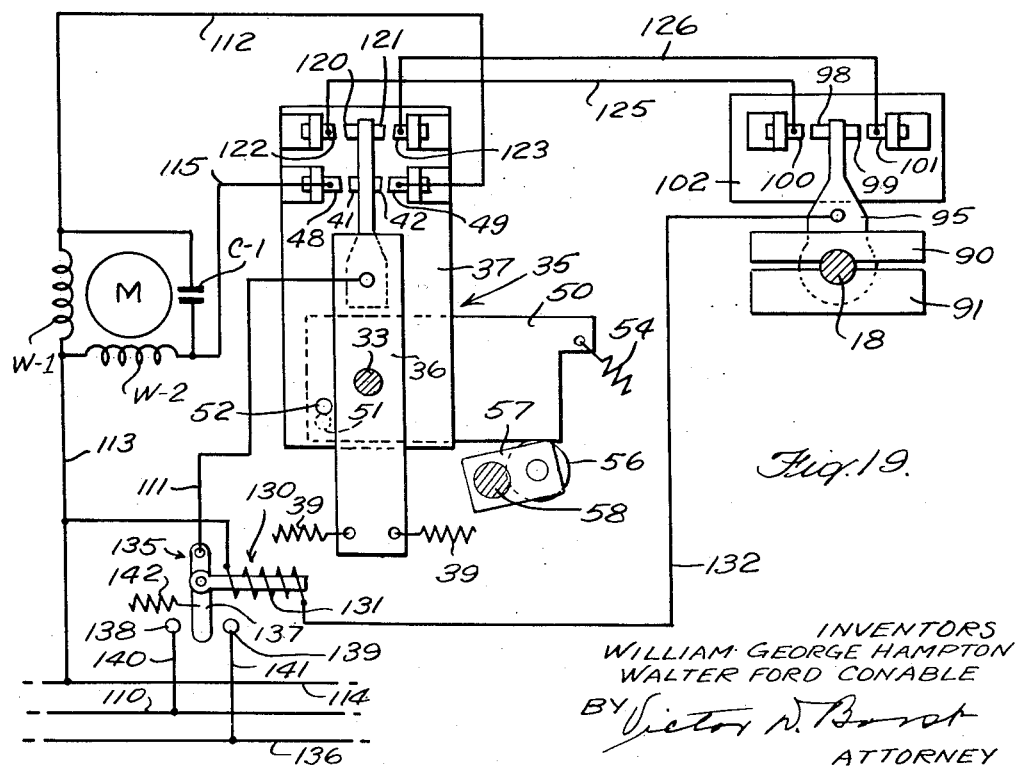
Fig. 19 is a view similar to Figs. 17 and 18 showing still another method of increasing the deceleration rate.

In Fig. 19 we have shown still another method of applying additional torque to the motor M during deceleration. In this form of the invention we connect the motor to a source of higher voltage during deceleration. To this end we interpose a single throw double pole switch 135 in the conductor 111 by which the conductor 111 is connected to the source 110 of lower voltage during acceleration and to the source 136 of higher voltage during deceleration. The switch 135 comprises the switch arm 137 and the poles 138 and 139. The pole 138 is connected to the source 110 of lower voltage by a conductor 140, and the pole 139 is connected to the source 136 of higher voltage by a conductor 141. During acceleration a spring 142 holds the switch arm 137 in contact with the pole 138, and the solenoid 130 holds the switch arm 137 in contact with the pole 139 during deceleration. In the form of the invention shown and described in connection with Fig. 18, the solenoid 130 is operative to apply the brake 124 to the shaft 18 during deceleration, and in the form of the invention shown in Fig. 19 the solenoid 130 is operative to hold the switch arm 137 in contact with the pole 139 during deceleration, and the energization of the motor M and the solenoid 130 is controlled by the switching mechanisms 35 and 89 in exactly the same manner in both of these forms of the invention. Consequently, it is believed that the description of the operation of the form of the invention shown in Fig. 18 will suffice for the form of the invention shown in Fig. 19.

From the foregoing it will be apparent to those skilled in this art that we have provided very simple and efficient means for accomplishing the objects of the invention.

It is to be understood that we are not limited to the forms of the invention shown and described herein as various modifications may be made therein within the spirit of the invention and the scope of the appended claims.

We claim:

1. A servo mechanism and control apparatus therefor comprising, a servo motor, an output shaft operatively connected to said servo motor, switch mechanism by which the operation of said servo motor is controlled in accordance with an input signal imparted thereto, transmission mechanism by which an input signal is imparted to said switch mechanism, said transmission mechanism including a differential by means of which the error between the input signal and the servo motor output is algebraically added to the input signal, and means operative in conjunction with said switch mechanism to increase the deceleration rate of said servo motor.

2. A servo mechanism and control apparatus therefor comprising a servo motor, an output shaft operatively connected to said servo motor, switch mechanism by which the operation of said servo motor is controlled in accordance with an input signal imparted thereto, transmission mechanism by which an input signal is imparted to said switch mechanism and means operative in conjunction with said switch mechanism to increase the torque applied to said servo motor during deceleration only, to thereby decrease the number and duration of motor overshoots during synchronizing in response to a signal calling for a change in position.

3. A servo mechanism and control apparatus therefor as defined in claim 2 in which the said increased torque is applied to said servo motor by increasing the phase shift between voltage and current vectors in said servo motor.

4. A servo mechanism and control apparatus therefor as defined in claim 2 in which the means to increase the torque applied to said servo motor during deceleration comprises a friction brake and means to apply said brake to said output shaft during deceleration of said motor.

5. A servo mechanism and control apparatus therefor as defined in claim 4 in which said brake applying means comprises a solenoid operatively connected to said brake, and a control switch for said solenoid, said control switch being operatively connected to said output shaft.

6. A servo mechanism and control apparatus therefor as defined in claim 2 in which the said increased torque is applied to said servo motor by connecting the said motor to a source of higher voltage during deceleration.

7. A servo mechanism and control apparatus therefor as defined in claim 6 in which the means for connecting said motor to a source of higher voltage during deceleration comprises a single throw double pole switch, a solenoid by which said switch is shifted from one position to the other, and a control switch for said solenoid, said control switch being operatively connected to said output shaft.

8. A servo mechanism and control apparatus therefor as defined in claim 1 in which said means includes a single throw double pole switch operatively connected to said output shaft and adapted to be shifted from one position to the other by a change in the direction of rotation of said output shaft.

9. A servo mechanism and control apparatus therefor as defined in claim 1 in which said means comprises a capacitor which is adapted to increase the phase shift between voltage and current vectors in said motors, and control means for said capacitor which comprises a double pole switch operatively connected to said output shaft and adapted to be shifted from one position to the other by a change in the direction of rotation of said output shaft.

10. A servo mechanism and control apparatus therefor as defined in claim 1 in which said means comprises a friction brake adapted to be applied to said output shaft during deceleration of said motor, a solenoid by which said brake is applied, and control means for said solenoid which comprises a double pole switch operatively connected to said output shaft and adapted to be shifted from one position to the other by a change in the direction of rotation of said output shaft.

11. A servo mechanism and control apparatus therefor as defined in claim 1 in which said means comprises a single throw double pole switch by which said motor is connected to a source of higher voltage during deceleration of said motor, a solenoid by which said double pole switch is shifted from one position to the other, and control means for said solenoid which comprises a second double pole switch operatively connected to said output shaft and adapted to be shifted from one position to the other by a change in the direction of rotation of said output shaft.

12. A servo mechanism and control apparatus therefor comprising, a servo motor, an output shaft operatively connected to said servo motor, switch mechanism by which the operation of said servo motor is controlled in accordance with an input signal imparted thereto, transmission mechanism by which an input signal is imparted to said switch mechanism, said transmission mechanism including a differential by means of which the error between the input signal and the servo motor output is algebraically added to the input signal, and means operative in conjunction with said switch mechanism to increase the torque applied to said servo motor during deceleration only, to thereby decrease the number and duration of motor overshoots during synchronizing in response to a signal calling for a change in position.

13. A servo mechanism and control apparatus therefor as defined in claim 12 in which the said increased torque is applied to said servo motor by increasing the phase shift between voltage and current vectors in said servo motor.

14. A servo mechanism and control apparatus therefor as defined in claim 12 in which the means to increase the torque applied to said servo motor during deceleration comprises a friction brake and means to apply said brbake to said ouput shaft during deceleration of said motor.

15. A servo mechanism and control apparatus therefor as defined in claim 14 in which brake applying means comprises a solenoid operatively connected to said brake, and a control switch for said solenoid, said control switch being operatively connected to said output shaft.

16. A servo mechanism and control apparatus therefor as defined in claim 12 in which the said increased torque is applied to said servo motor by connecting the said motor to a source of higher voltage during deceleration.

17. A servo mechanism and control appartus therefor as defined in claim 16 in which the means for connecitng said motor to a source of higher voltage during deceleration comprises a single throw double pole switch, a solenoid by which said switch is shifted from one position to the other, and a control switch for said solenoid, said control switch being operatively connected to said output shaft.

18. A servo mechanism and control apparatus therefor comprising a servo motor, an output shaft operatively connected to said servo motor, switch mechanism by which the operation of said servo motor is controlled in accordance with an input signal imparted thereto, transmission mechanism by which an input signal is imparted to said switch mechanism, and means operative in conjunction with said switch mechanism to increase the deceleration rate of said servo motor, said means including a single throw double pole switch operatively connected to said output shaft and adapted to be shifted from one position to the other by a change in the direction of rotation of said output shaft.

19. A servo mechanism and control apparatus therefor comprising a servo motor, an output shaft operatively connected to said servo motor, switch mechanism by which the operation of said servo motor is controlled in accordance with an input signal imparted thereto, transmission mechanism by which an input signal is imparted to said switch mechanism, and means operative in conjunction with said switch mechanism to increase the deceleration rate of said servo motor, said means comprising a capacitor which is adapted to increase the phase shift between voltage and current vectors in said motor, and control means for said capacitor which comprises a double pole switch operatively connected to said output shaft and adapted to be shifted from one position to the other by a change in the direction of rotation of said output shaft.

20. A servo mechanism and control apparatus therefor comprising a servo motor, an output shaft operatively connected to said servo motor, switch mechanism by which the operation of said servo motor is controlled in accordance with an input signal imparted thereto, transmission mechanism by which an input signal is imparted to said switch mechanism, and means operative in conjunction with said switch mechanism to increase the deceleration rate of said servo motor, said means comprising a friction brake adapted to be applied to said output shaft during deceleration of said motor, a solenoid by which said brake is applied, and control means for said solenoid which comprises a double pole switch operatively connected to said output shaft and adapted to be shifted from one position to the other by a change in the direction of rotation of said output shaft.

21. A servo mechanism and control apparatus therefor comprising a servo motor, an output shaft operatively connected to said servo motor, switch mechanism by which the operation of said servo motor is controlled in accordance with an input signal imparted thereto, transmission mechanism by which an input signal is imparted to said switch mechanism, and means operative in conjunction with said switch mechanism to increase the deceleration rate of said servo motor, said means comprising a single throw double pole switch by which said motor is connected to a souce of higher voltage during deceleration of said motor, a solenoid by which said double pole switch is shifted from one position to the other, and control means for said solenoid which comprises a second double pole switch operatively connected to said output shaft and adapted to be shifted from one position to the other by a change in the direction of rotation of said output shaft.

References Cited in the file of this patent

UNITED STATES PATENTS 2,796,569    McDonald _____ June 18, 1957